Jan. 12, 1932.          C. E. BROWN                1,840,564
                      VALVE ASSEMBLY
                   Filed Oct. 18, 1929
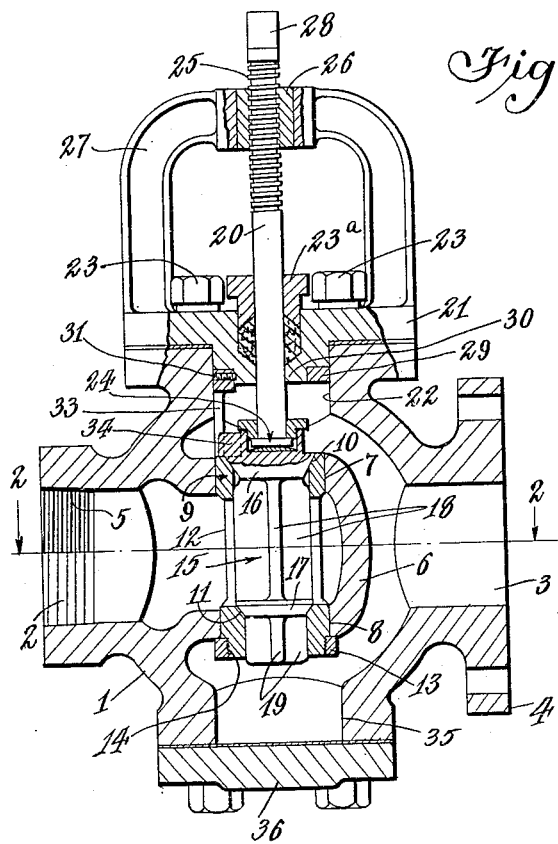
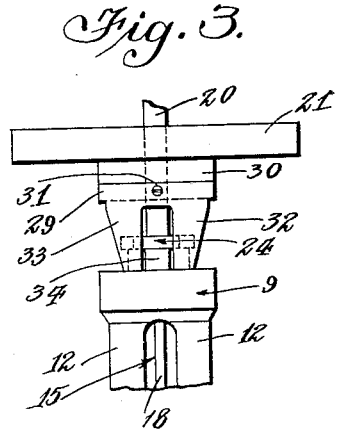
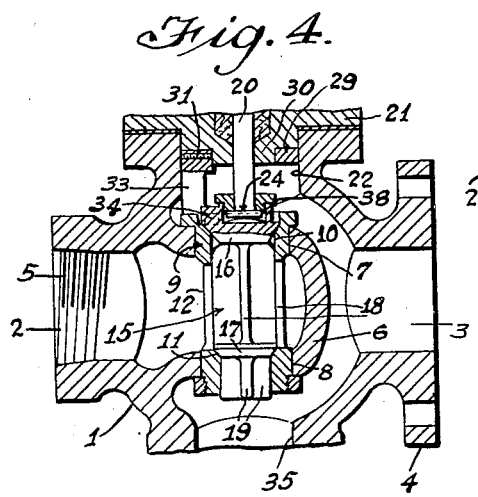
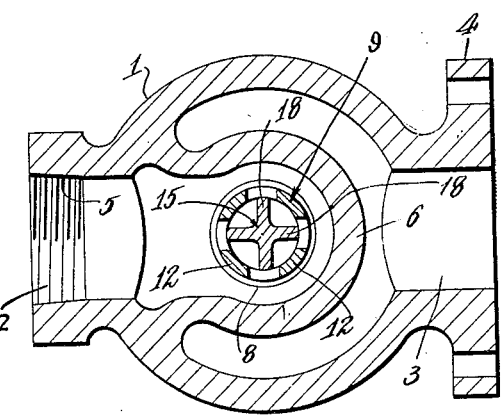
Inventor
Charles E. Brown
By Lyon & Lyon
Attorney Patented Jan. 12, 1932

1,840,564

UNITED STATES PATENT OFFICE

CHARLES E. BROWN, OF LOS ANGELES, CALIFORNIA

VALVE ASSEMBLY

Application filed October 18, 1929. Serial No. 400,583.

This invention relates to an improved valve assembly whereby a substantially balanced valve may be assembled or taken apart and repaired with great ease and rapidity. In general, the invention relates to a substantially balanced valve consisting of two valves seating on two seats, said seats being formed in a unitary cage.

An object of this invention is to disclose and provide a substantially balanced throttle valve in which the wearing parts may be readily replaced.

Another object is to disclose and provide a valve assembly which permits the removal of valve seats.

Another object is to disclose and provide a balanced valve assembly in which the valves are prevented from rotation on their seats.

A still further object is to disclose and provide a valve assembly in which the valve seats are removably positioned and in which said seats cooperate with a unitary valve member including two valves adapted to simultaneously seat upon said valve seats carried by the liner.

Other objects, uses and advantages of this invention will become apparent from the following detailed description of a preferred form of the invention, reference being had to the appended drawings, in which:

Fig. 1 is a vertical section through one form of valve embracing my invention.

Fig. 2 is a horizontal section taken along the plane 2—2 of Fig. 1.

Fig. 3 is an elevation of a portion of the valve assembly.

Fig. 4 is a vertical section through a modified form of valve embracing this invention.

As shown in the drawings, the valve may include a body portion 1 having inlet and outlet ports 2 and 3. These ports are preferably in alinement with each other. As shown, the body portion 1 may be provided with a flange or flanges 4 by means of which the valve body may be connected to a suitable line, or with threads 5 by means of which the valve body may be connected to a suitable line.

Within the body portion 1 an inner head 6 is preferably provided. The inner head 6 may be spherical or tubular in form, and preferably in direct communication with the inlet port 2. Ports 7 and 8 are preferably formed in the inner head 6, said ports 7 and 8 being alined with each other so that the center lines of said ports extend transversely of the axis passing through the inlet and outlet ports 2 and 3.

The ports 7 and 8 may be tapered, if desired; that is, the walls of the ports 7 and 8 may be in alinement with each other so as to form a taper. If desired, only one of said ports, such as for example the port 7, may be tapered.

A unitary liner cage 9 is provided, said liner cage 9 being adapted to be received in the ports 7 and 8. The liner cage 9 may be provided with a valve seat 10 and a valve seat 11, the valve seats 10 and 11 being spaced from each other so that when the liner cage 9 is received in the ports 7 and 8 and positioned therein, the valve seats 10 and 11 will lie in substantially the planes of the ports 7 and 8. Preferably, the unitary liner cage 9 consists of an upper solid ring in which the valve seat 10 is formed, a lower solid ring in which the valve seat 11 is formed, and connecting vanes 12.

By a unitary liner cage I do not desire to be limited to a cage actually cast or made out of one integral piece of metal, but merely refer to a unitary body which, if desired, may be made of separate upper and lower rings, attached to a connecting cage. It is preferable, however, that the entire cage be made integrally.

Preferably, the unitary liner cage is removably attached to the inner head 6, as for example, by means of a locking collar 13 adapted to come into threaded engagement with the liner cage 9 as indicated at 14. If the ports 7 and 8 have cylindrical sides and are of the same diameter, then the upper portion of the liner cage 9 may be provided with a shoulder 38 adapted to rest on the outer edges of the inner head 6 (as shown in Fig. 4), so that by tightening the collar 13 the shoulder is caused to seat itself on the outer edges of the inner head 6. Preferably, however, ports 7 and 8 are tapered (slightly conical in form) so that the liner cage 9 is slidably received with a taper-fit in said ports, and merely tightened into place by the collar 13, the mean diameter of the port 7 being greater than the mean diameter of the port 8.

A valve member 15 is provided, said valve member including two valve portions 16 and 17 adapted to seat upon the seats 10 and 11, respectively. Said valves 16 and 17 may be connected to each other by means of radially extending guiding wings 18. Similar guiding wings 19 may extend below the valve 17. It will thus be seen that when the valve member 15 is in position in the liner 9, fluid entering through port 2 will exert a pressure on the under side of valve 16 and on the upper side of valve 17. In this manner a substantially balanced valve is provided.

When the valve member 15 is moved upwardly, however, both valves 16 and 17 are opened simultaneously, thus permitting fluid to pass between the vanes 12 of the liner cage 9 and to be discharged through the upper and lower ports opened by the valves 16 and 17.

Means for actuating the valve member 15 may be provided, such means including a stem 20 passing through a suitable cover plate 21 applied to an opening 22 in the body portion 1, said opening 22 being in alinement with the ports 7 and 8 of the inner head 6. The cover plate 21 may be removably connected to the body portion 1 as by means of bolts 23. A packing gland 23a may be provided around the stem 20 so as to maintain a fluid-tight connection. A swivel joint 24 is preferably provided between the stem 20 and the valve member 15.

The upper portion of the stem 20 may have threads 25 cut thereon, said threads engaging with an internally threaded collar 26 held rigidly in a suitable frame 27 attached to the cover plate 21. In this manner, rotation of the stem 20 in any suitable manner, as for example, by the application of a wrench or wheel to a squared end 28 of the stem 20 will cause said stem to move longitudinally, thereby raising the valve member 15.

Means are also preferably provided for preventing rotation of the valve member 15. Said means may include a stationary guide and a dog carried by the valve member. For example, the stationary guide may comprise a collar 29 attached to the boss 30 of the cover 21, as by means of a set screw 31. The collar 29 may be provided with downwardly extending spaced fingers 32 and 33, said fingers 32 and 33 resting upon the upper edge of the cage 9. A dog 34 may be carried by the valve member 15, said dog extending into the opening between the fingers 32 and 33. In this manner the longitudinal motion of stem 20 imparts a longitudinal motion to valve member 15, but said valve member 15 is prevented from rotation by reason of the dog 24 carried thereby being held within the opening between the fingers 32 and 33 of the stationary collar 29.

In order to facilitate assembly and change of liners and valve members 15, an opening 35 is preferably formed in the body portion 1 in alinement with the ports 7 and 8 of the inner head 6 and the opening 22. A removable cover 36 is preferably provided for the opening 35. If a valve of the above construction shows wear, then the cover plate 21 is loosened and removed and the cover plate 36 is removed. Removal of the cover plate 21 permits the valve member 15 to be withdrawn through the opening 22. By removing the cover plate 36, access is made to the ring 13 which may be then taken off the unitary liner cage 9. After the ring 13 has been taken off, the entire cage 9 may be pushed or knocked out of the valve through the port or opening 22.

It is understood that balanced valves have been employed heretofore, but it has been exceedingly difficult to cause the valve member, such as the valve member 15, to seat properly on both valve seats at the same time. The construction described hereinabove, however, permits the preparation of standard unitary liner cages at the factory, said liner cages carrying two valve seats in fixed spaced relation thereon. Any valve member 15 may be formed to thus fit and properly seat on the seats carried by the liner cage. Furthermore, the finished valve may be readily repaired and need not be taken out of the line in order to regrind the valve seats. Instead, the valve is opened, the valve member and the liner cage removed, and a new valve member and liner cage inserted into the valve body.

Although a specific form of construction has been described in detail, it is to be understood that I am not to be limited to precisely the form of construction and assembly of elements shown, but instead the invention embraces all such changes and modifications as come within the scope of the appended claims. Furthermore, it is understood that the valve assembly described herein may be used for various purposes, such as for example, throttle valves, steam valves, oil lines and the like.

I claim:

1. A valve assembly comprising a valve body portion, an inner head in said body portion, alined ports in opposite sides of said head, a unitary liner cage adapted to be slidably received with a taper-fit in said ports, valve seats carried by said liner cage in substantially the planes of said ports, means for removably attaching said liner cage to said inner head, a valve member including two valves adapted to simultaneously seat upon said valve seats carried by said liner cage, means for actuating said valve member, and means for preventing rotation of said valve member.

2. A valve assembly comprising a valve body portion, an inner head in said body portion, alined ports in opposite sides of said head, a unitary liner cage adapted to be slidably received with a taper-fit in said ports, valve seats carried by said liner cage in substantially the planes of said ports, means for removably attaching said liner cage to said inner head, a valve member including two valves adapted to simultaneously seat upon said valve seats carried by said liner cage, an opening in said body portion alined with said ports, a removable cover for said body opening, and means for preventing rotation of said valve member, said means including a stationary guide carried by said cover, and a dog carried by said valve member adapted to cooperate with said guide.

3. A valve assembly comprising a valve body portion, an inner head in said body portion, alined ports in opposite sides of said head, a unitary liner cage adapted to be slidably received with a taper-fit in said ports, valve seats carried by said liner cage in substantially the planes of said ports, means for removably attaching said liner cage to said inner head, a valve member including two valves adapted to simultaneously seat upon said valve seats carried by said liner cage, an opening in said body portion alined with said ports, a removable cover for said body opening, means for preventing rotation of said valve member, said means including a stationary guide carried by said cover, and a dog carried by said valve member adapted to cooperate with said guide, and means for actuating said valve member.

4. A valve assembly comprising a valve body portion, an inner head in said body portion, alined ports in opposite sides of said head, a unitary liner cage adapted to be slidably received with a taper-fit in said ports, valve seats carried by said liner cage in substantially the planes of said ports, means for removably attaching said liner cage to said inner head, a valve member including two valves adapted to simultaneously seat upon said valve seats carried by said liner cage, an opening in said body portion alined with said ports, a removable cover for said body opening, means for preventing rotation of said valve member, said means including a stationary guide carried by said cover and a dog carried by said valve member adapted to cooperate with said guide, and means for actuating said valve member, said means including a stem and a swivel connection between said stem and valve member.

5. A valve assembly comprising a valve body portion, an inner head in said body portion, alined ports in opposite sides of said head, a unitary liner cage adapted to be slidably received with a taper-fit in said ports, valve seats carried by said liner cage in substantially the planes of said ports, means for removably attaching said liner cage to said inner head, a valve member including two valves adapted to simultaneously seat upon said valve seats carried by said liner cage, and means for preventing rotation of said valve member, said means including a stationary guide, and a dog carried by said valve member adapted to cooperate with said guide.

Signed at Los Angeles, Calif., this 12th day of Oct., 1929.

CHARLES E. BROWN.